(12) United States Patent
Schubert

(10) Patent No.: US 7,306,763 B2
(45) Date of Patent: Dec. 11, 2007

(54) METALLURGICAL VESSEL FOR MELTING DEVICE FOR LIQUID METALS

(75) Inventor: Manfred Schubert, Oberhausen (DE)

(73) Assignee: SMS Demag Aktiengesellschaft, Düsseldorf (DE)

( * ) Notice: Subject to any disclaimer, the term of this patent is extended or adjusted under 35 U.S.C. 154(b) by 508 days.

(21) Appl. No.: 10/928,629

(22) Filed: Aug. 26, 2004

(65) Prior Publication Data
US 2005/0046094 A1    Mar. 3, 2005

(30) Foreign Application Priority Data
Aug. 26, 2003   (DE) ............... 103 39 085

(51) Int. Cl.
C21B 3/06   (2006.01)
(52) U.S. Cl. ............ 266/241; 266/901; 373/74
(58) Field of Classification Search ............ 266/241, 266/242, 901; 373/74, 75, 76
See application file for complete search history.

(56) References Cited

U.S. PATENT DOCUMENTS

| | | |
|---|---|---|
| 4,161,620 A | 7/1979 | Nakamura |
| 4,458,351 A | 7/1984 | Richards |
| 4,580,271 A * | 4/1986 | Vatant .................. 373/76 |
| 6,693,949 B1 | 2/2004 | Schubert et al. |
| 2002/0001332 A1 | 1/2002 | Shver |

FOREIGN PATENT DOCUMENTS

EP    0699885    12/2001

* cited by examiner

Primary Examiner—Scott Kastler
(74) Attorney, Agent, or Firm—Friedrich Kueffner

(57) ABSTRACT

A metallurgical vessel for a melting device for liquid metals has a vessel top, a vessel bottom provided with a collar, and an intermediate ring arranged between the vessel top and the vessel bottom. The vessel bottom receives a melt defining a melting zone within the vessel bottom and, above the melting zone, a slag zone for slag is provided. The intermediate ring is arranged at a level of the slag zone. The vessel top completely bridges the intermediate ring and is supported below the intermediate ring on the collar of the vessel bottom so that the intermediate ring is statically completely relieved of any load.

13 Claims, 4 Drawing Sheets

A-A

METALLURGICAL VESSEL FOR MELTING DEVICE FOR LIQUID METALS

BACKGROUND OF THE INVENTION

1. Field of the Invention

The invention relates to a metallurgical vessel for melting device or holding devices for liquid metal. It comprises a top part as well as a bottom part provided with a collar on which the top part is supported. The bottom part receives the melt and, above the melting zone, the slag zone adjoins as an area of the generated slag. At the level of the slag zone, an annular cooling device is arranged between the vessel top part and the vessel bottom part.

2. Description of the Related Art

Melting vessels, for example, electric arc furnaces operated with direct current or alternating current are known in the prior art. They are comprised of a water-cooled top part and a refractory-lined bottom part. The bottom part is comprised of a metal jacket or sheet metal plates that are not cooled. The sheet metal jacket has, for example, a collar on which the top part is supported. The bottom part extends across the melting zone as well as the slag zone.

These bottom parts, in particular in the area of the slag zone, are exposed increasingly to thermal stress. This is so, on the one hand, because of the furnace operation that entails ever increasing melting output and shorter intervals between tapping. On the other hand, refractory materials and refractory material qualities having a high carbon contents are used that lead to an improved thermal conduction from the interior of the furnace to the furnace vessel. In this way, the thermal loadability of the sheet metal plates of the furnace jacket or vessel bottom that are not cooled is often surpassed. The result of such local overheating of the bottom part in the area of the slag zone is warping or deformations of the vessel to the point of necessitating a replacement of the sheet metal jacket.

Moreover, the occurring deformations make it more difficult to line the vessel with refractory material and affect the service life of the refractory material.

Since the top part is supported on the bottom part, deformations of the top part may also result as a subsequent damage in the case of excessive deformations of the bottom part.

Such a furnace vessel with top part and bottom part is disclosed in European patent 0 699 885 B1. The bottom part is comprised of a jacket of sheet steel having a collar wherein the bottom part is lined with refractory material. In order to minimize heat loss that results from the fact that the entire vessel wall area is cooled, it is proposed that the vessel wall is cooled only by an upper and a lower cooling device and the intermediately positioned area of the vessel wall above the slag line that faces the interior of the vessel is comprised essentially of refractory material. The second lower cooling device in the form of a ring is arranged at the level of the slag line. The top part of the vessel rests on the refractory lining of the bottom part as well as on the collar of the sheet metal jacket. In addition to providing the cooling function, the second lower cooling device at the same time provides also the supporting structure for the ceramic wall part and the lid of the furnace vessel. The top part of the vessel is supported by means of an exterior cage that extends about the entire top part of the vessel.

SUMMARY OF THE INVENTION

It is an object of the present invention to provide a furnace vessel for melting devices or holding devices for liquid metal that withstands the increasing operational demands during furnace operation.

In accordance with the present invention, this is achieved in that the top part of the vessel, bridging entirely the annular device that is configured as an intermediate ring, is supported below the intermediate ring only on the collar of the bottom part of the vessel, wherein the intermediate ring is statically completely relieved of any load.

The gist of the invention resides in that between the vessel top and the vessel bottom at the level of the slag zone an intermediate ring is arranged and forms part of the side wall of the vessel and in that the intermediate ring is completely relieved of any load. This is achieved in that the top part of the vessel below the intermediate ring is supported on the vessel bottom (bottom part of the vessel), i.e., the top part of the vessel (vessel top) completely bridges the intermediate ring at the level of the slag zone.

According to the invention, the critical vessel area, i.e., the vessel wall of the slag zone, is statically relieved of any stress or load and, by means of the preferably loosely mounted sheet metal plates within the intermediate ring, a protection against thermal overload is provided; in this way, the service life of the vessel is increased. The intermediate ring provides a support function for the refractory lining but provides no load bearing function, neither for the vessel top nor for the lid of the vessel. The intermediate ring forms a separate independent intermediate zone of the vessel wall at the level of the slag zone in order to receive completely independently the thermal loads and in order to be easily exchangeable or replaceable. Moreover, it is advantageous that, as a result of the solution embodied as a statically relieved intermediate ring, the shape of the furnace vessel in the area of the slag zone, despite high and non-uniform thermal load in comparison to conventional furnaces, can be essentially maintained. This results in an improvement of the refractory lining situation.

According to a preferred embodiment, this intermediate ring is designed as a cage structure. Advantageously, the intermediate ring takes on a cooling function. The stays of the cage are preferably provided in the form of hollow profiled sections through which a cooling medium, such as air or water, can flow. These hollow profiled sections are preferably tube sections or tube segments. The intermediate spaces, or the open windows, between these stays or bars of the frame of the cage structure are closed by sheet metal plates that face the inner side of the furnace or vessel. These sheet metal plates serve for supporting the refractory material.

The top part of the vessel is not supported on the intermediate ring and therefore does not load the intermediate ring. For supporting the vessel top, the vessel has stable stilts whose ends are supported on the collar of the bottom part of the vessel and, as a result of this, bridge the intermediate ring that is arranged on the inner side of the collar of the sheet metal jacket of the vessel bottom.

The sheet metal plates are preferably loosely inserted in the intermediate spaces or open windows or openings of the frame of the cage structure of the intermediate ring. They can be arranged so as to be guided but are essentially loose, i.e., they can slide in their guides. Accordingly it is possible to withstand a thermal deformation load with a minimal displacement option. Moreover, the sheet metal plates can be exchanged easily and quickly.

In order to achieve an even better cooling action of the slag area, it is possible to mount slag line panels, known in the art, in the cooled intermediate ring; preferably, they are mounted on the loose sheet metal plates. According to a preferred embodiment, for this purpose the sheet metal plates have passages for the blades or cooling vanes of the slag line panels. The intermediate spaces between the blades or cooling vanes are injected instead of using refractory bricks. The slag line panels can be provided with a separate cooling device in that the side of the sheet metal plates facing away from the furnace are provided with blocks, essentially made of copper, through which cooling medium flows.

It is recommended according to a preferred embodiment to connect these slag line panels with the cooling medium system that also cools the cage construction of the intermediate ring. Accordingly, the cooled cage of the intermediate ring can also be used for supplying the slag line panels with cooling medium.

DESCRIPTION OF THE PREFERRED EMBODIMENTS

Figure 1:
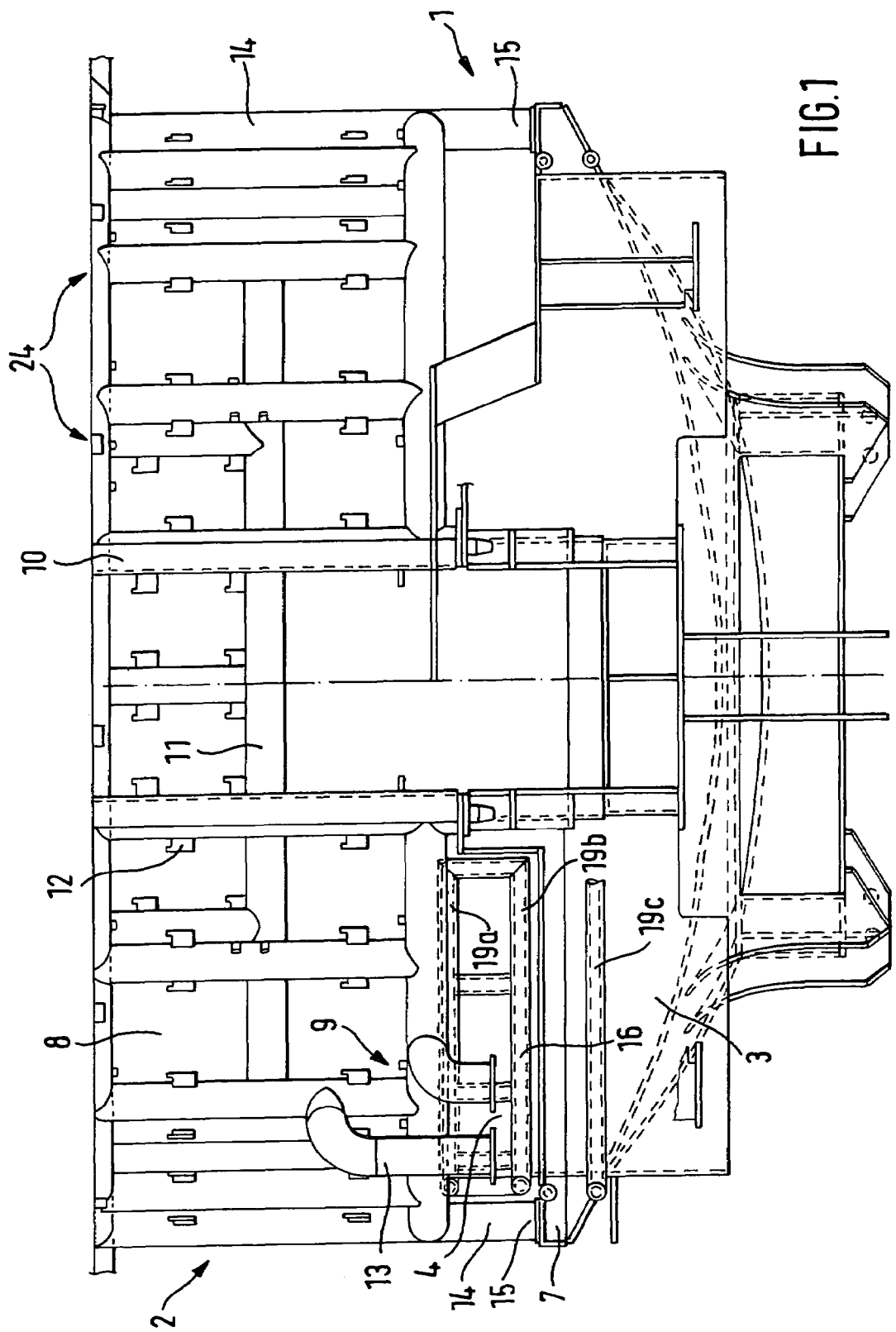
FIG. 1 is a side view of the melting vessel of an electric arc furnace with vessel top and vessel bottom and an intermediate ring arranged therebetween.
Figure 2:
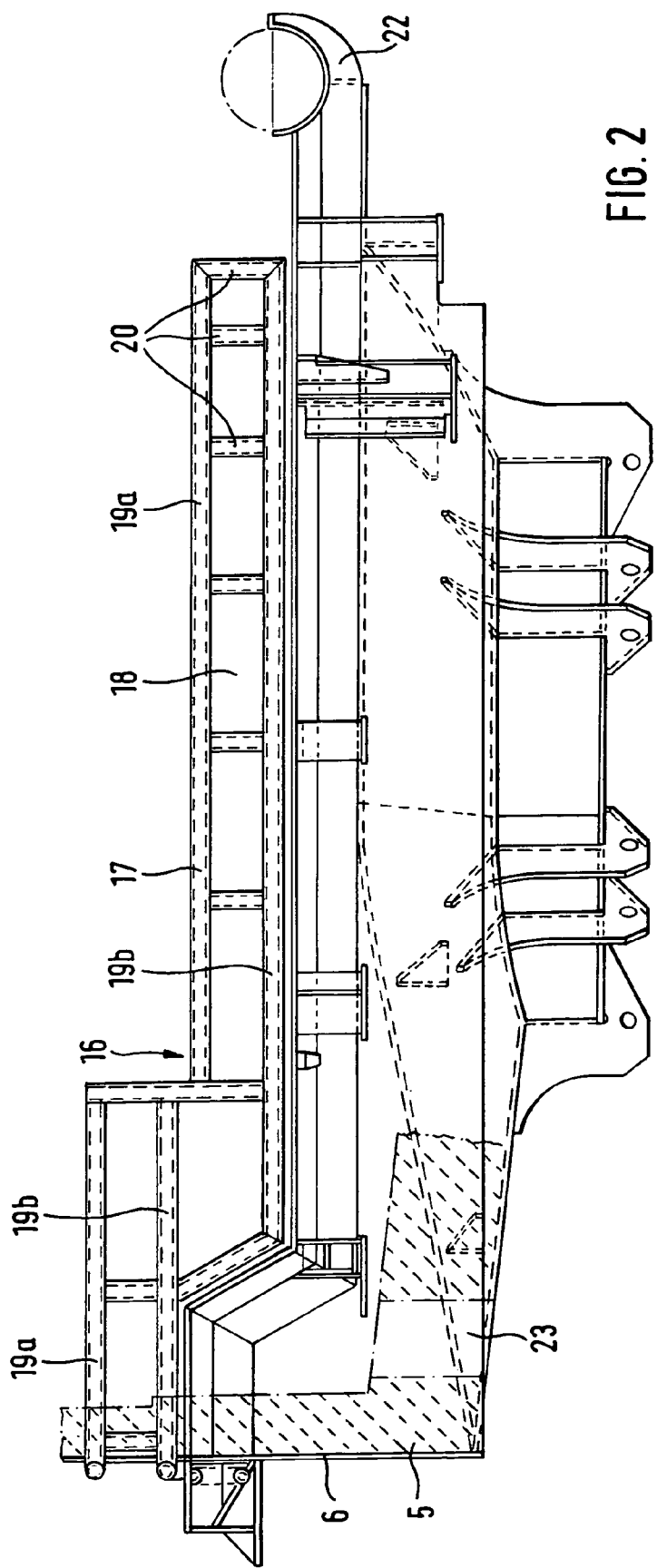
FIG. 2 is a side view of the melting vessel according to FIG. 1, showing the longitudinal side, without the vessel top.

FIGS. 1 and 2 show side views of the vessel 1 according to the invention for a melting device or holding device, i.e., a metallurgical vessel 1 for processes that form slag or other aggressive zones. The furnace vessel 1 is comprised of three essential elements, i.e., the vessel top 2, the vessel bottom 3, as well as an intermediate ring 4.

The vessel bottom 3 is comprised of a sheet metal jacket 6 (compare FIG. 2) that is lined with refractory material 5. The sheet metal jacket 6 ends with a projecting collar 7 at the upper edge of the vessel bottom 3. The vessel top 2 of the vessel is arranged on the collar 7. The vessel top 2 itself has cooled wall elements 8. The cooling action, in particular, water cooling, is provided by a cage structure 24 comprised of a split pipe/pipe construction 9. The split pipes 10, 11 that extend longitudinally and transversely are connected fixedly to the wall elements 8 by means of fastening elements 12. They communicate via conduits 13 with a cooling water supply and removal system (not illustrated). The cooling cage structure or split pipe/pipe construction 9 that covers the entire wall comprises stable stilts or legs 14, in the form of hollow profiled sections, whose ends 15 are supported on the collar 7 of the vessel bottom 3.

The intermediate ring 4 is arranged between the vessel bottom 3 and the vessel top 2 at the slag line above the melting zone that is generated during operation, i.e., in the area of the slag generated during furnace operation, so as to be statically relieved from load; this is achieved in that the vessel top 2 is supported directly on the edge (at 7) of the bottom vessel 3 so that it bridges the intermediate ring 4 and is not supported on the intermediate ring 4. The intermediate ring 4 is arranged at the level of the slag layer forming during operation of the furnace and can be approximately flush with the slag line that is formed during operation.

The intermediate ring 4 is comprised in the illustrated embodiment, to which the present invention is not limited, of a cooled cage structure 16 formed of a frame wherein, however, no split pipes are fastened along wall elements but instead the cooling medium conduits are comprised of complete hollow profile sections or hollow pipe sections 17. In the interstitial spaces of the frame of the cage structure 16 that are formed by a certain pattern of the frame of the cage structure, for example, substantially rectangular interstitial spaces, sheet metal plates 18 are inserted loosely. These sheet metal plates 18 serve for supporting the brick-lined refractory material facing the interior of the furnace.

In the illustrated embodiment, the cage structure 16, to which the invention is not limited, is comprised of two parallel, spaced apart pipe segments 19a, 19b that are connected to one another by means of intermediate segments 20 to provide a flow circuit. These pipe segments extend essentially parallel to the mill floor level when the furnace vessel is not tilted. FIG. 1 illustrates that also a third pipe segment 19c is possible. The number of pipe segments as well as the pattern of the cage structure and of the water distribution depend on the slag zone, i.e., the slag generation to be expected and the slag level and quantity.

As mentioned above, in the intermediate spaces of the frame of the cage structure formed by the pipe segments sheet metal plates are inserted loosely. The term loosely in this connection means that the sheet metal plates are guided, if necessary, but have sufficient play in order to compensate thermal stress by being able to move. For this purpose, the sheet metal plates according to a preferred embodiment are slidable along the pipe segments in appropriate guides.

Figure 3:
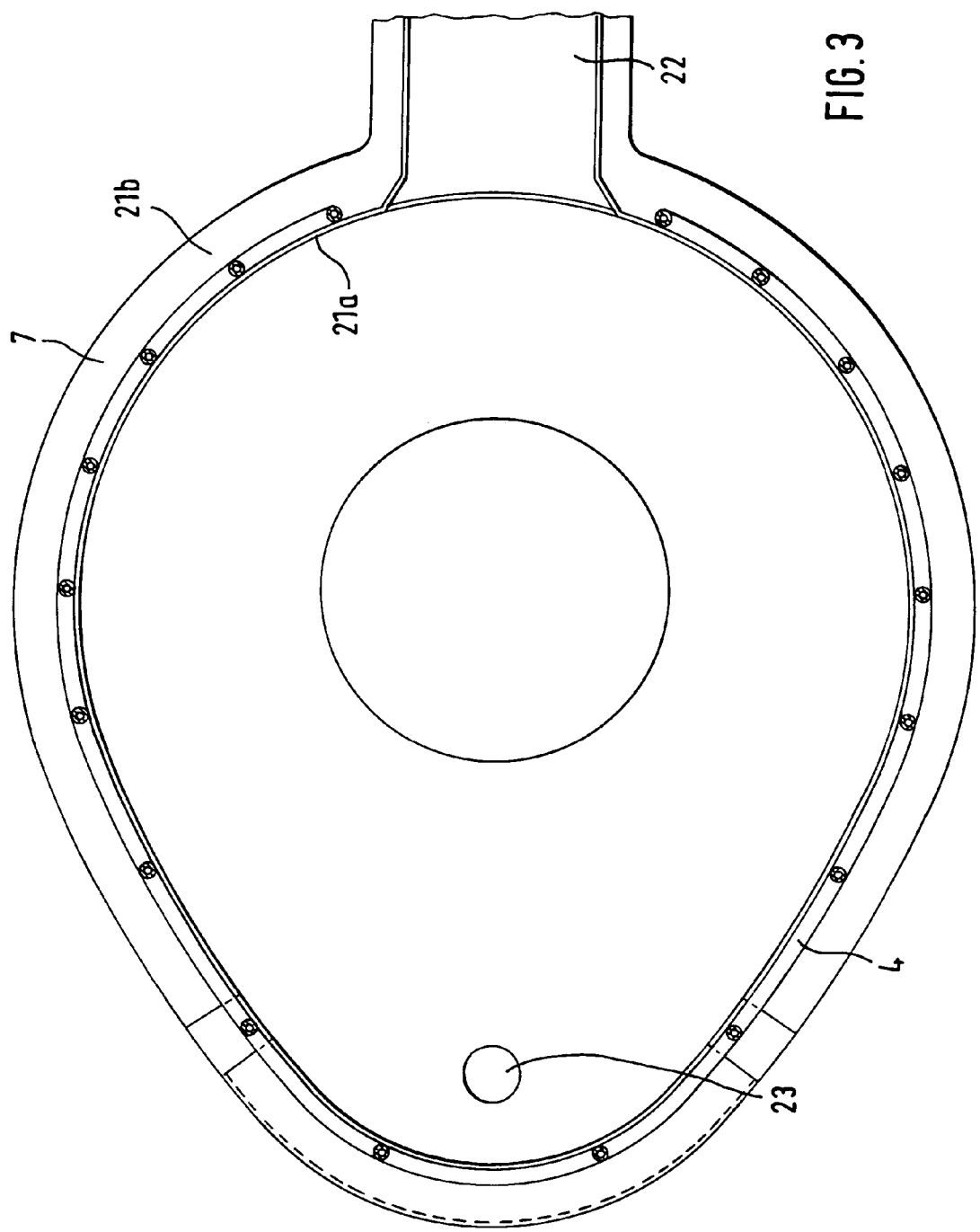
FIG. 3 shows a section of the melting vessel of FIG. 1 and FIG. 2 at the level of the intermediate ring.

FIGS. 2 and 3 illustrate in more detail the specific configuration of the cage structure 16 of the intermediate ring 4 in accordance with the illustrated embodiment. The intermediate ring 4 extends essentially about the entire circumference of the vessel bottom 3 along the inner side 21a of the projecting collar 7 of the vessel bottom 3. The intermediate ring 4 is interrupted only in the slag door area 22 of the furnace vessel 1. In the opposed area of the tap hole 23, the cage structure of the intermediate ring 4 is somewhat higher than in the remaining part of the furnace and protects in this way during tapping the zone that is thermally stressed the most (compare FIG. 2). The outer side 21b of the projecting collar 7 forms a support surface for the legs or stilts 14 of the vessel top 2.

Figure 4:
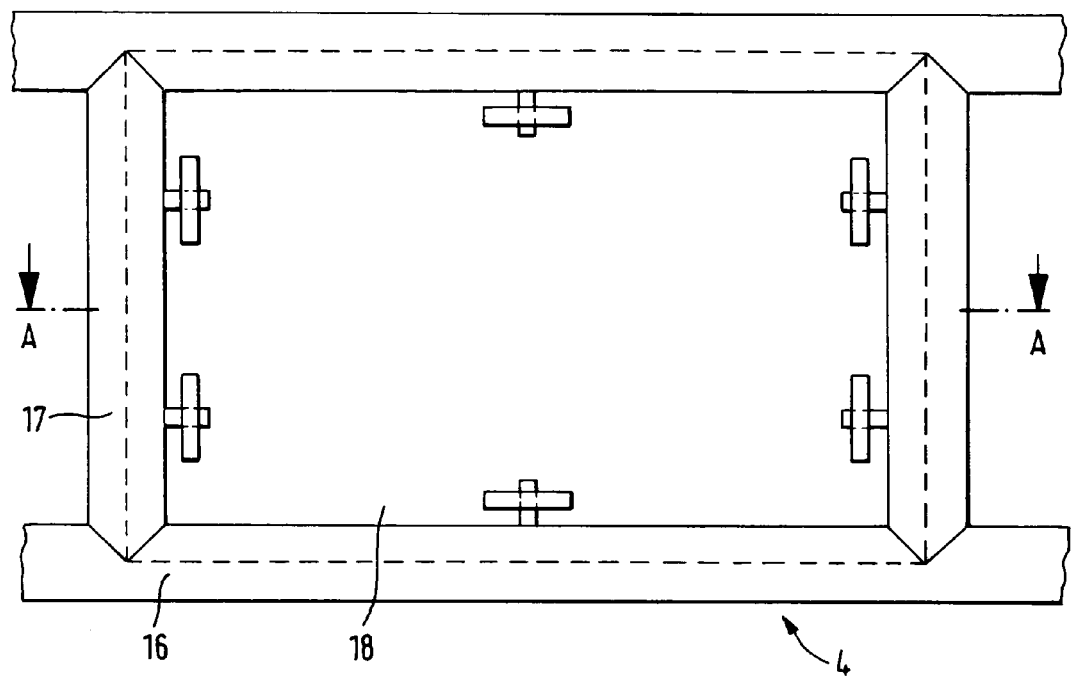
FIG. 4 is a side view onto a section of the intermediate ring.
Figure 5:
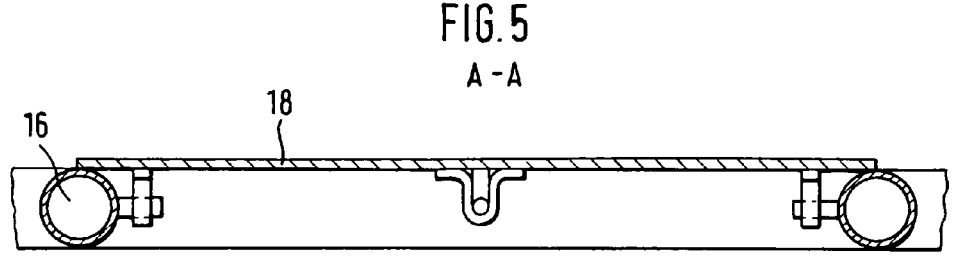
FIG. 5 is a section taken along the section line V-V indicated in FIG. 4.

As an alternative to brick lining with refractory material, it is proposed to mount slag line panels, known in the art, in the sheet metal plates inserted into the intermediate ring, as illustrated in FIGS. 4 and 5.

The vessel according to the invention is suitable in particular as a furnace vessel for alternating current and direct current electric arc furnaces used as melting devices. However, it can also be used as a holding device for molten material with slag or other thermally stressed zones. Because of the complete static load relief of the preferably cooled intermediate ring 4, the invention provides a furnace vessel 1 that is resilient with regard to thermal overloads and exhibits a long service life.

While specific embodiments of the invention have been shown and described in detail to illustrate the inventive principles, it will be understood that the invention may be embodied otherwise without departing from such principles.

What is claimed is:

1. A metallurgical vessel for a melting device for liquid metals comprising:
   a vessel top and a vessel bottom provided with a collar;
   an intermediate ring arranged between the vessel top and the vessel bottom, the intermediate ring being a cage structure with stays formed as hollow profile sections between which sheet metal plates are arranged;
   wherein the vessel bottom receives a melt defining a melting zone within the vessel bottom and wherein above the melting zone a slag zone for slag is provided within the metallurgical vessel;
   wherein the intermediate ring is arranged at a level of the slag zone;
   wherein the vessel top completely bridges the intermediate ring and is supported below the intermediate ring on the collar of the vessel bottom so that the 1 intermediate ring is statically completely relieved of any load.

2. The metallurgical vessel according to claim 1, wherein the intermediate ring is a cage structure comprising a frame and sheet metal plates that are arranged on the frame of the cage structure, wherein the sheet metal plates have a side facing an interior of the vessel, respectively, wherein the sides are provided with refractory material.

3. The metallurgical vessel according to claim 2, wherein the sheet metal plates are loosely inserted into the frame and positioned within intermediate spaces of the frame.

4. The metallurgical vessel according to claim 2, wherein the sheet metal plates are slidable along guides provided on the cage structure.

5. The metallurgical vessel according to claim 2, further comprising slag line panels that are mounted on the sheet metal plates.

6. The metallurgical vessel according to claim 5, wherein the sheet metal plates are provided with passages for blades or vanes of the slag line panels.

7. The metallurgical vessel according to claim 5, wherein the slag line panels communicate with hollow profiled sections of the cage structure of the intermediate ring, wherein the hollow profiled sections supply a cooling medium to the cage structure of the intermediate ring and to the slag line panels.

8. The metallurgical vessel according to claim 2, wherein the intermediate ring is a cooling device.

9. The metallurgical vessel according to claim 8, wherein the frame of the cage structure is comprised of closed hollow profiled sections through which a cooling medium flows.

10. The metallurgical vessel according to claim 9, wherein the closed hollow profiled sections are pipe sections.

11. The metallurgical vessel according to claim 1, wherein the vessel top has stable stilts whose ends are supported on the collar of the vessel bottom.

12. The metallurgical vessel according to claim 11, wherein the collar has an inner side and an outer side, wherein the intermediate ring is arranged on the inner side of the collar of the vessel bottom so that the intermediate ring is statically relieved of load, and wherein on the outer side of the collar the stilts of the vessel top are supported.

13. The metallurgical vessel according to claim 12, wherein the vessel top comprises a cage structure and wherein the stilts form a part of the cage structure of the vessel top.

* * * * *